US012657887B2

(12) United States Patent
Huang et al.

(10) Patent No.: US 12,657,887 B2
(45) Date of Patent: Jun. 16, 2026

(54) PERCENTILE-BASED PSEUDO-LABEL SELECTION FOR MULTI-LABEL SEMI-SUPERVISED CLASSIFICATION

(71) Applicant: Autodesk, Inc., San Francisco, CA (US)

(72) Inventors: Junxiang Huang, Revere, MA (US); Alexander Huang, Fremont, CA (US); Beatriz Chinelato Guerra, San Antonio, TX (US); Yen-Yun Yu, Murray, UT (US)

(73) Assignee: AUTODESK, INC., San Francisco, CA (US)

( * ) Notice: Subject to any disclaimer, the term of this patent is extended or adjusted under 35 U.S.C. 154(b) by 487 days.

(21) Appl. No.: 18/452,780

(22) Filed: Aug. 21, 2023

(65) Prior Publication Data

US 2024/0071056 A1     Feb. 29, 2024

Related U.S. Application Data

(60) Provisional application No. 63/373,588, filed on Aug. 26, 2022.

(51) Int. Cl.
*G06V 10/774*          (2022.01)
*G06V 10/764*          (2022.01)

(52) U.S. Cl.
CPC ........ *G06V 10/7753* (2022.01); *G06V 10/764* (2022.01)

(58) Field of Classification Search
CPC .. G06V 10/7753; G06V 10/764; G06V 10/82; G06V 10/765; G06V 10/774; G06N 3/047; G06N 3/08; G06N 3/08958
See application file for complete search history.

(56) References Cited

U.S. PATENT DOCUMENTS

2022/0156591 A1*   5/2022   Li ........................... G06V 10/82
2022/0392051 A1*   12/2022   Hur ..................... G06F 18/2433
                (Continued)

OTHER PUBLICATIONS

Extended European Search Report dated Dec. 12, 2023 for European Patent Application No. 23193288.0.
                (Continued)

*Primary Examiner* — John B Strege

(74) *Attorney, Agent, or Firm* — Gates & Cooper LLP

(57)          ABSTRACT

A method and system provide for augmenting a photograph. An unlabeled photograph is obtained. A weakly augmented photograph and a strongly augmented photograph are obtained from the unlabeled photograph based on different types of data augmentation methods. The weakly augmented photograph is processed through a model to generate multiple weakly augmented photograph class predictions (with assigned probabilities). The multiple weakly augmented photograph class predictions are converted into positive pseudo-labels (indicating a presence of a class) or negative pseudo-labels (indicating absence of a class) using different fixed percentile thresholds. The strongly augmented photograph is processed through the model to generate a strongly augmented photograph class prediction. The model is trained to make the strongly augmented photograph label prediction match the positive pseudo-label via a cross-entropy loss. The trained model is then utilized to label the unlabeled photograph with multiple labels.

20 Claims, 6 Drawing Sheets

(56) References Cited

U.S. PATENT DOCUMENTS

2023/0053716 A1* 2/2023 Weinzaepfel ............. G06N 3/04
2023/0154167 A1* 5/2023 Li ............................ G06T 7/73
                                                        382/159
2024/0347175 A1* 10/2024 Wang ................ G06V 10/7753

OTHER PUBLICATIONS

Sohn, K., et al., "FixMatch: Simplifying Semi-Supervised Learning with Consistency and Confidence", arxiv.org, Cornell University Library, Cornell University, Jan. 2020, XP081582899, pp. 1-14.
Cascante-Bonilla, P., et al., "Curriculum Labeling: Revisiting Pseudo-Labeling for Semi-Supervised Learning", arxiv.org, Cornell University Library, Cornell University, Dec. 2020, XP081834881, pp. 1-13.
Shenoy, A., "Pseudo-Labeling to deal with small datasets—What, Why & How? Towards Data Science", Dec. 2019, XP093106564, https://towardsdatascience.com/pseudo-labeling-to-deal-with-smalldatasets-what-why-how-fd6f903213a [retrieved on Nov. 28, 2023], pp. 1-36.
European Decision to Grant dated Aug. 28, 2025 for European Patent Application No. 23193288.0.
European Communication under Rule 71 (3) EPC dated Mar. 24, 2025 for European Patent Application No. 23193288.0.
Tarvainen, A., et al., "Mean teachers are better role models: Weight-averaged consistency targets improve semi-supervised deep learning results", Advances in Neural Information Processing Systems, 2017, pp. 1-10.
Zhang, B., et al. "FlexMatch: Boosting Semi-Supervised Learning with Curriculum Pseudo Labeling", Advances in Neural Information Processing Systems, 2021, pp. 8408-18419, vol. 34, No. 1.
Gong, C., et al., "Multi-modal Curriculum Learning for Semi-supervised Image Classification", IEEE Transactions on Image Processing, 2016, pp. 3249-3260, vol. 25, No. 7.
Xing, C. et al., "Distance-Based Learning From Errors for Confidence Calibration", 8th International Conference on Learning Representations, ICLR 2020, OpenReview.net, 2020.
Raffel C., et al., "Exploring the Limits of Transfer Learning with a Unified Text-to-Text Transformer", Journal of Machine Learning Research, 2020, pp. 1-67, vol. 21, No. 140.
Gil, D., et al., "Classification of Images from Construction Sites Using a Deep-Learning Algorithm", Proceedings of the International Symposium on Automation and Robotics in Construction, 2018, pp. 1-6, vol. 35.
Berthelot, D., et al., "MixMatch: A Holistic Approach to Semi-Supervised Learning", 33rd Conference on Neural Information Processing Systems, 2019, pp. 1-11.
Mahajan, D., et al., "Exploring the Limits of Weakly Supervised Pretraining", Proceedings of the European Conference on Computer Vision (ECCV), 2018, pp. 181-196.
Lee, D-H., "Pseudo-Label: The Simple and Efficient Semi-Supervised Learning Method for Deep Neural Networks", CML 2013 Workshop : Challenges in Representation Learning (WREPL), 2013, pp. 1-6, vol. 3.
Arazo, E., et al., "Pseudo-Labeling and Confirmation Bias in Deep Semi-Supervised Learning", 2020 International Joint Conference on Neural Networks (IJCNN), pp. 1-8.
Liu, F., et al., "Self-supervised Mean Teacher for Semi-supervised Chest X-ray Classification", Machine Learning in Medical Imaging, 12th International Workshop, Sep. 2021, pp. 426-436.
Hacohen, G., et al., "On the Power of Curriculum Learning in Training Deep Networks", International Conference on Machine Learning, PMLR, 2019, pp. 1-13.
Tokunaga, H., et al., "Negative Pseudo Labeling using Class Proportion for Semantic Segmentation in Pathology", Computer Vision—ECCV 2020, pp. 430-446.
Elezi, I., et al., "Not All Labels Are Equal: Rationalizing the Labeling Costs for Training Object Detectio", Proceedings of the IEEE/CVF Conference on Computer Vision and Pattern Recognition, 2022, pp. 14492-14501.

Yalniz, I.Z., et al., "Billion-scale semi-supervised learning for image classification", ArXiv, abs/1905.00546, 2019, pp. 1-12.
Hestness, J., et al., "Deep Learning Scaling is Predictable, Empirically", CoRR, abs/1712.00409, 2017, pp. 1-19.
Sohn, K., et al., "Fixmatch: Simplifying semi-supervised learning with consistency and confidence", 34th Conference on Neural Information Processing Systems, 2020, pp. 596-608.
Kingma, D.P., et al., "Adam: A method for stochastic optimization", arXiv preprint arXiv:1412.6980, 2014, pp. 1-15.
Van Der Maaten, L., et al., "Visualizing data using t-sne", Journal of Machine Learning Research, 2008, pp. 2579-26059, vol. 11, 2008.
Everingham, M., et al., "The PASCAL Visual Object Classes (VOC) Challenge", International Journal of Computer Vision, Jun. 2010, pp. 303-338, vol. 88, No. 2.
Rizve, M.N., et al., "IIN Defense of Pseudo-Labeling: an Uncertainty-Aware Pseudo-Label Selection Framework for Semi-Supervised Learning", International Conference on Learning Representations, 2021. arXiv preprint arXiv:2101.06329, pp. 1-20.
Sajjadi, M.S.M., et al., "Regularization With Stochastic Transformations and Perturbations for Deep Semi-Supervised Learning", 30th Conference on Neural Information Processing Systems (NIPS 2016), pp. 1-9.
Xie, Q., et al., "Unsupervised Data Augmentation for Consistency Training", Advances in Neural Information Processing Systems 33: Annual Conference on Neural Information Processing Systems 2020, Dec. 2020, pp. 1-13.
Laine, S., et al., et al., "Temporal Ensembling for Semi-Supervised Learning", ArXiv, abs/1610.02242, 2017, pp. 1-13.
Ridnik, T., et al., "Asymmetric Loss for Multi-Label Classification", Proceedings of the IEEE/CVF International Conference on Computer Vision, 2021, pp. 82-91.
Ridnik, T., et al., "ML-Decoder: Scalable and Versatile Classification Head", Proceedings of the IEEE/CVF Winter Conference on Applications of Computer Vision, 2021, pp. 32-41.
Chen, T., et al., "A Simple Framework for Contrastive Learning of Visual Representations", International Conference on Machine Learning, 2020, pp. 1597-1607.
Lin, T-Y., et al., "Microsoft COCO: Common Objects in Context", European Conference on Computer Vision, 2014, pp. 740-755.
Yang, X., et al., A Survey on Deep Semi-Supervised Learning, IEEE Transactions on Knowledge and Data Engineering, 2023, pp. 8934-8954, vol. 35, No. 9.
Zhu, X., Semi-supervised Learning Literature Survey, Technical Report, Sep. 2005, pp. 1-39.
Wang, X., et al., "ChestX-ray8: Hospital-scale Chest X-ray Database and Benchmarks on Weakly-Supervised Classification and Localization of Common Thorax Diseases", 2017 IEEE Conference on Computer Vision and Pattern Recognition, pp. 3462-3471.
Wu, X., et al., "When Do Curricula Work?", 9th International Conference on Learning Representations, May 2021, pp. 1-23.
Lecun, Y., et al., "Gradient-based learning applied to document recognition", Proceedings of the IEEE, 1998, 86(11), pp. 2278-2324.
Xu, Y., et al., "Dash: Semi-Supervised Learning with Dynamic Thresholding", Proceedings of the 38th International Conference on Machine Learning, Jul. 2021, pp. 11525-11536, vol. 139 of Proceedings of Machine Learning Research.
Wang, Y., et al., "FreeMatch: Self-adaptive Thresholding for Semi-supervised Learning", CoRR, abs/ arXiv preprint arXiv:2205.07246, 2022, pp. 1-18.
Wang, Y., et al., "Semi-Supervised Semantic Segmentation Using Unreliable Pseudo-Labels" ArXiv, abs/2203.03884, 2022. Proceedings of the IEEE/CVF Conference on Computer Vision and Pattern Recognition, pp. 1-13.
Zheng, Z., et al., "Rectifying Pseudo Label Learning via Uncertainty Estimation for Domain Adaptive Semantic Segmentation" International Journal of Computer Vision, 2021, pp. 1106-1120, vol. 129, No. 4.

* cited by examiner

PERCENTILE-BASED PSEUDO-LABEL SELECTION FOR MULTI-LABEL SEMI-SUPERVISED CLASSIFICATION

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 63/373,588, filed on Aug. 26, 2022, with inventor(s) Yen-Yun Yu, Junxiang Huang, Alexander Huang, and Beatriz Chinelato Guerra, entitled "PercentMatch: Percentile-based Pseudo-label Selection for Multi-Label Semi-Supervised Classification."

BACKGROUND OF THE INVENTION

1. Field of the Invention

The present invention relates generally to tagging/labeling images, and in particular, to a method, apparatus, system, and article of manufacture for using semi-supervised learning (SSL) to perform multi-label classification.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

One of the problems of the prior art is that of adding multiple tags to photos/images. The use of multiple tags in different industries may have different benefits. For example, in the construction industry, millions of photos are taken. To help manage such photos and to enable stakeholders to track progress of a construction project (e.g., based on what is available in the photos). it is useful to add tags automatically for the user/customer. In this regard, there can be hundreds of tags for a single photo. Due to the sheer number of photos, it is impossible for a human (or multiple humans) to manually add tags to such photos. Accordingly, what is needed is the ability to automatically tag such images/photos.

Deep learning models may be used to tag such images/photos. However, the models need to be trained. To train the hundreds of elements (to be tagged), a significant labeling process with thousands of photos and a multitude of construction specialists (different stakeholders in construction have different knowledge bases regarding how and what and how elements should/could be tagged) would be needed. There are millions of photos available that could be used to train models but there is not enough time or resources to tag such photos in order to train the models. In this regard, there is a significant portion of such photos that are unlabeled.

In view of the above, what is needed is the ability to identify all different objects that appear in an image/photo (e.g., objects, ladders, forklifts, walls, etc.) and train a model sufficiently to automatically label such elements in new photos. Semi-supervised learning has been used to add labels to photos while some elements remain unlabeled. In this regard, it would be useful to combine unlabeled data with a subset of labeled data to enable robust projections and evaluations of images. However, semi-supervised learning has not been utilized in a successful manner in the construction industry.

To better understand the problems of the prior art, a detailed description of deep learning models and semi-supervised learning may be useful.

Deep learning models have achieved superior performance for various computer vision applications, partially thanks to their ability to scale up with large amount of training data [10, 16, 17]. Even though it has been empirically confirmed that deep learning models gain stronger performance through supervised training with a larger dataset, the benefits of such performance improvement accompany a significant cost: generating high-quality annotations is an expensive and laborious process, especially when domain expertise is required [7, 26, 5]. To alleviate the strong reliance on labeled data, semi-supervised learning (SSL) methods have been developed for the past decades to improve model performance by utilizing a tremendous amount of unlabeled data along with labeled data [37, 34].

There are two popular paradigms that recent SSL methods have adopted: pseudo-labeling which uses a model's class predictions as artificial labels to train successor models [13, 33, 8, 2] and consistency learning which enforces models to output consistent predictions on similar images [11, 21]. Some modern SSL methods have shown that the combinations of these two paradigms produce outstanding results for single-label classification tasks [30, 22, 35].

Despite its application importance and inherent generality, how to extend the success of SSL to multi-label classification does not receive enough attention and investigation [15, 20]. In order to bring all potentialities of SSL methods into full play, several extra challenges in multi-label classification need to be addressed:

(1) Class presence becomes independent, which disables information achievement by method of exclusion. In single-label classification, even if a classifier learns terribly on one class, it is still able to correctly recognize positive samples of that class as long as it gives low scores to the other classes. In other words, given the number of classes $C$, a method of exclusion increases the probability of getting correct pseudo-labels by discarding some unlikely choices from the total $C$ possible outcomes. But class independence in multi-label tasks turns the number of all possible outcomes into $2^C$ and invalidates this method.

(2) A common assumption many SSL build on is that the classification decision surface should favor low-density areas of the marginal data distribution. However, if the distribution density variance between different classes is huge, which is common for multi-label datasets, an adaptive density thresholding is needed for this assumption. FIGS. 1A-1C illustrate the additional challenges that exist for multi-label classification compared to that of single-label classification. In particular, FIG. 1A illustrates an example visualization of feature embedding of a Modified National Institute of Standards and Technology (MNIST) database test set using t-SNE (t-distributed Stochastic Neighbor Embedding) method [25]. The 10 classes 102 are perfectly balanced, and with a suitable encoder the samples with the same label are well clustered. The two features are also valid for many single-label datasets. In other words, in FIG. 1A, data points from a MNIST database [12] are visualized as an example of single-label dataset with good class balance, on which a decent decision boundary can be generated by avoiding the high-density cluster regions.

FIG. 1B illustrates an artificially created class imbalance in MNIST by randomly removing 90% samples from classes 0-4 and then visualizing using the same method. In other words, in FIG. 1B, class imbalance is artificially introduced by down sampling half of the classes. However, if the same method (as that of FIG. 1A) is applied based on vari, it could lead to decision boundaries. Further, one may note that as multi-label datasets are typically more class-imbalanced than single-label ones, class-specific thresholds become more critical in SSL tasks.

(3) Unlike single-label dataset, where the major part of an image usually represents the target class, multi-label targets may only occupy a small fraction of pixels in an image they appear, such as class "scissors" in FIG. 1C. In this regard, FIG. 1C shows a sample image from MS-COCO (MICROSOFT-Common Objects In Context) (ID:054918), in which the class "scissors" only occupies a negligibly small fraction of pixels. While the example image 104 is easy SSL material for classes "cat" and "sink," it is at the same time hard SSL material for some other classes. This suggests that in multi-label SSL scenarios, one may need to evaluate the learning difficulty in the level of sample-label pair, which is different from the sample level evaluation in single-label curriculum learning [29].

Taking the above special challenges into considerations, it is desirable to provide a capability for multi-label semi-supervised classification. To better understand such problems a description of prior SSL methods, a description of models with paradigms of pseudo-labeling and consistency learning may be useful.

Pseudo-Labeling

The key idea of pseudo-labeling is to use a pre-trained teacher model to infer on unlabeled data and generate a set of corresponding artificial pseudo-labels, which are then mixed with real labeled data to train a student model [13, 33]. For single-label tasks, the pseudo-label of an unlabeled sample is selected as the class with the maximum prediction score. However, as incorrect pseudo-labels will confuse models and lower the final performance, the central problem of this paradigm is to select as few incorrect pseudo-labels as possible getting as many correct ones at the same time. A common solution is to choose a high score threshold and select only samples with a maximum score exceeding the threshold. Within this paradigm, based on the direction of changing this score threshold, curriculum learning [3] and anti-curriculum learning [9] are proposed: the former feeds only easy pseudo-labels, i.e., samples with high scores, to models first, then progressively includes hard pseudo-labels, i.e., samples with low scores. The latter reverts the order of easy and hard pseudo-labels.

In order to convert numeric score output from teacher models to binary pseudo-labels, a universal score threshold or a set of class-specific thresholds are chosen. If the probability of a given class is above this threshold, then that class is assigned as the pseudo-label for that example. However, since these labels are generated by a model and are not ground truth annotations, they may be somewhat noisy and biased. Thus, to further improve the quality of the pseudo-labels, a common trick is to sharpen the probability distribution via a temperature parameter [2]. Alternatively in [3], the authors use a percentile-based threshold that is decreased over time. These techniques have typically been applied to the single-label classification case where there only needs to be one threshold. However, in the multi-label classification case, it is not clear whether a single threshold is enough to produce reliable pseudo-labels across all classes.

Consistency Learning

The methodology of consistency learning consists to perturb each sample with different augmentations and encourage the model to make similar predictions on the perturbed instances. One example is the Pi-model [21], which performs two parallel stochastic augmentations on each unlabeled data and generates two prediction vectors on both disturbed versions. A stability loss is introduced to penalize different predictions for the same input sample by taking the mean square difference between two prediction vectors. Temporal ensembling is based on the same principle with a more general framework. In short, it generates one augmented version for each sample and keeps track of the moving average of predictions, then encourages models to output predictions that are similar to the moving average on the same samples. MixMatch [2] extends the Pi-model by generating predictions on different versions of each sample obtained via parallel stochastic augmentations, and then encouraging the predictions to be close to the averaged scores.

Some recent SSL methods have combined these two SSL paradigms by using weak and strong augmentations. UDA (Unsupervised Data Augmentation) [30] and FixMatch [22] perform a weak stochastic augmentation and a strong augmentation on unlabeled data, and introduce a fixed high score threshold to select only pseudo-labels whose confidence scores exceed the threshold. A loss term is leveraged to lead the strongly augmented predictions get closer to the corresponding selected pseudo-labels. This score-based thresholding is critical as it helps to retain high-quality pseudo-labels and reduce confirmation bias. Given the importance of thresholding, FlexMatch [35] argues that as the learning difficulty varies for different classes, a dynamical threshold for each class would increase the SSL efficiency. The key insight of FlexMatch is that by estimating the class-specific learning status, the score threshold can be adjusted for each class to improve the performance on hard classes. Besides, Dash [32] also adjusts the score thresholds by gradually increasing the universal threshold for all classes as the training progresses. FreeMatch [27] goes further by having the thresholds adjusted in a self-adaptive manner. AdaMatch [31] provides a unified solution of SSL and domain adaptation by having thresholds based on labeled data and ignoring unlabeled data distribution. As previous methods achieve strong performance on single-label datasets, they might fail to consider the specific challenges in multi-label classification tasks.

In addition to dynamic thresholding techniques, another direction to improve pseudo-labeling efficiency is negative label learning. The previous mentioned methods typically use one positive threshold per class to select and discard all predictions on a sample. However, such an approach throws away those extremely-low-score predictions which indicate the absence of a class with high confidence. In Uncertainty-aware Pseudo-label Selection [20], the authors introduce a negative threshold so that if the confidence score for a prediction is sufficiently low, it is considered as a negative example. They further enhance this procedure by introducing positive and negative uncertainty thresholds which ensures that the selected pseudo-label (whether positive or negative) has low enough uncertainty. This was shown to improve pseudo-label accuracy. In [28], the authors used an entropy threshold in combination with a rank-based threshold to select negative labels as those that have a low enough confidence score and have high entropy. In [24], the authors assign negative pseudo-labels based on a weakly supervised signal.

SUMMARY OF THE INVENTION

Embodiments of the invention combine the ideas of pseudo-labeling and consistency learning. A separate positive and negative threshold are introduced for each class, these thresholds are dynamically updated throughout training, and a robustness constraint is incorporated based on random augmentations.

While much of recent study in semi-supervised learning (SSL) has achieved strong performance on single-label classification problems, an equally important yet underexplored problem is how to leverage the advantage of unlabeled data in multi-label classification tasks. To extend the success of SSL to multi-label classification, embodiments of the invention first analyze with illustrative examples to get some intuition about the extra challenges that exist in multi-label classification. Based on the analysis, embodiments of the invention provide a percentile-based threshold adjusting scheme to dynamically alter the score thresholds of positive and negative pseudo-labels for each class during the training, as well as dynamic unlabeled loss weights that further reduces noise from early-stage unlabeled predictions. Without loss of simplicity, embodiments of the invention achieve strong performance on Pascal VOC2007 and MS-COCO datasets when compared to recent SSL methods.

BRIEF DESCRIPTION OF THE DRAWINGS

Referring now to the drawings in which like reference numbers represent corresponding parts throughout.

DETAILED DESCRIPTION OF THE INVENTION

Figures 1A, 1B, 1C:
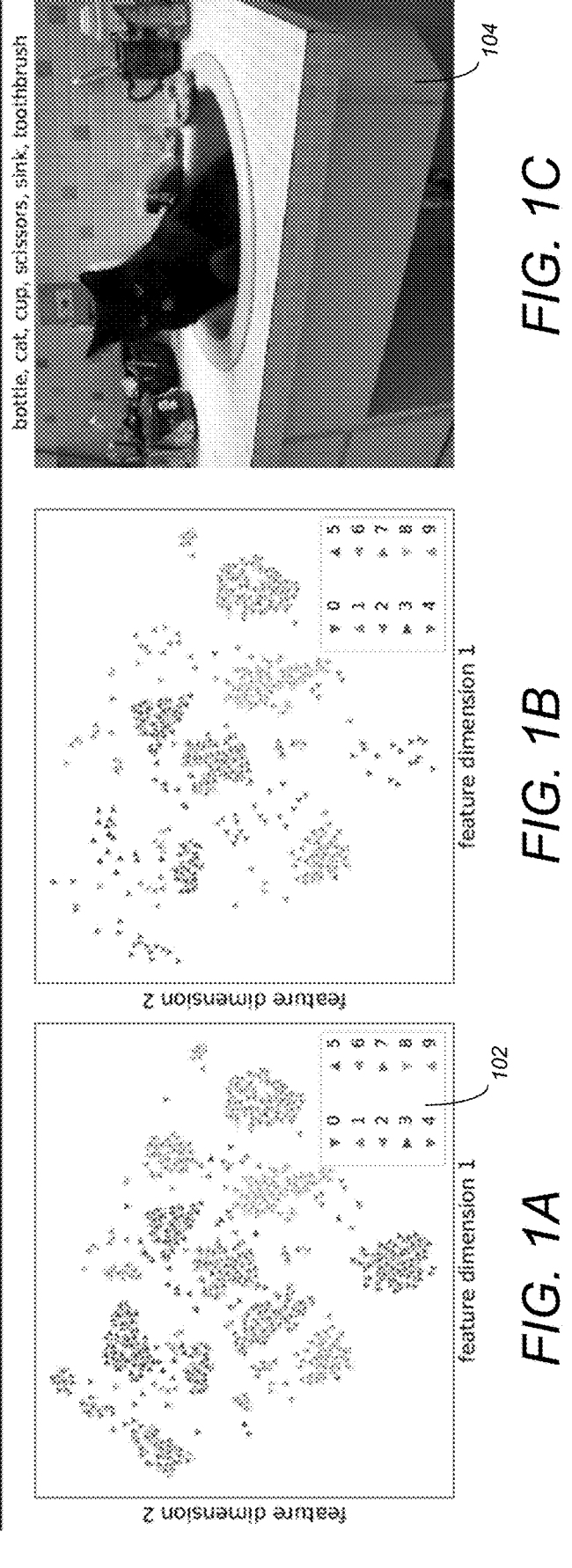
FIGS. 1A-1C illustrate the additional challenges that exist for multi-label classification compared to that of single-label classification.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a percentile-based threshold adjusting scheme for multi-label semi-supervised classification. Contributions of the invention may include (amongst other contributions/advantages): (1) a simple dynamic threshold framework to reduce the noise induced by incorrect pseudo-labels; (2) a natural methodology that can generalize prior SSL methods from single-label classification to multi-label classification, (3) empirical experiments showing that the invention has outperformed the previous results on the Pascal VOC2007 [6], and new benchmark results on MS-COCO[14] dataset.

Multi-Classification Details

Compared to FixMatch, embodiments of the invention provide at least three modifications addressing the special challenges in multi-label classification problems. Specifically, embodiments of the invention: (i) utilize negative label learning along with positive labels to select suitable sample-class pairs; (2) replace fixed score thresholds with fixed percentile thresholds to accommodate different learning difficulties of classes; and (3) provide learning-status-aware unlabeled loss weights to reduce noisy pseudo-labels.

In the description below, the notations used in [20] are followed: Assume there is a labeled dataset of $N_L$ samples denoted by $$D_L = \{x^{(i)}, y^{(i)}\}_{i=1}^{N_L},$$

where x is the input, and $$y^{(i)} = [y_1^{(i)}, \ldots, y_C^{(i)}] \in \{0, 1\}^C$$

is the corresponding label with C classes. For i-th labeled sample, $$y_c^{(i)} = 1$$

indicates the presence of class c and $$y_c^{(i)} = 0$$

denotes its absence. Let $$D_U = \left\{x_U^{(i)} {}_{i=1}^{N_U}\right\}$$

be an unlabeled dataset of $N_U$ samples, which does not contain labels for its inputs. For i-th unlabeled sample, $$p(\omega(x_U^{(i)})) = [p_1^{(i)}, \ldots, p_C^{(i)}] \in [0, 1]^C$$

is the soft prediction (confidence score) of a model, where $\omega(\bullet)$ refers to the weak stochastic data augmentation function. With a chosen score threshold $\tau_c$ for class c, the soft prediction $$p_c^{(i)}$$

is converted to hard pseudo-label by $$\hat{p}_c^{(i)} = \mathbb{1}\left(p_c^{(i)} > \tau_c\right).$$

SSL task is learning a parameterized model on the combined dataset $D_L \cup D_U$.

Positive and Negative Pseudo-Label Learning

Selecting suitable unlabeled samples is a critical component in prior SSL methods based on either pseudo-labeling or consistency learning, because predictions on unlabeled samples with high uncertainty will lower performance by confusing model and should be filtered out [36, 31]. In single label classification tasks, a widely adopted solution is selecting unlabeled samples whose maximum class score exceeds a high score threshold, which could be fixed [13, 22] or varying during training [35]. The assumption behind this is that a high score threshold can filter out noisy pseudo labels and leave only high-accuracy ones, leading to a decrease in the confirmation bias [1]. Since the probability vector of each sample sums to 1, a negative pseudo-label of any selected sample must correspond to a probability that is less than $1-\tau$. In practice, with $\tau > 0.5$, we technically have a positive score threshold $\tau_+ = \tau$ and an implied negative score threshold $\tau_- = 1 - \tau$. Confidence scores above $\tau_+$ are assigned 1, those below $\tau_-$ are assigned 0, and the interval between $\tau_-$ and $\tau_+$ becomes a discarded region. Samples with any score that falls between $\tau_-$ and $\tau_+$ are ignored as a whole.

On the other hand, for multi-label classification, the confidence scores of all classes are no longer required to sum to 1. As a consequence, one may need to explicitly introduce both score thresholds $\tau_{\pm}$ where $$\tau_- < \tau_+. \text{ Let } g^{(i)} = \left[g_1^{(i)}, \ldots, g_C^{(i)}\right] \in \{0, 1\}^C$$

be the binary vector indicating the pseudo-label selection for the i-th unlabeled sample, where $$g_c^{(i)} = 1$$

when $$\hat{p}_c^{(i)}$$

is selected and $$g_c^{(i)} = 0$$

otherwise. This vector is generalized as follows for both single-label and multi-label classification:

$$g_c^{(i)} = \mathbb{1}\left[p_c^{(i)} > \tau_{c,+}\right] + \mathbb{1}\left[p_c^{(i)} < \tau_{c,-}\right]. \tag{1}$$

Formally, the unsupervised training objective for unlabeled data can be written as $$\mathcal{L}_u = \frac{1}{\mu B} \sum_{i=1}^{\mu B} g^{(i)} \cdot \mathcal{H}\left(\hat{p}\left(\omega\left(x_U^{(i)}\right)\right), p\left(\Omega\left(x_U^{(i)}\right)\right)\right), \tag{2}$$

where B is the labeled batch size, $\mu$ is the ratio of unlabeled batch size to labeled batch size, $\mathcal{H}(\cdot, \cdot)$ represents asymmetric loss [18], and $\omega(\cdot)$ and $\Omega(\cdot)$ are correspondingly the weak and strong stochastic data augmentation functions.

Percentile Thresholds

As indicated in [35], the divergent learning difficulties and distribution of different classes make it challenging to choose a universal score threshold for all classes. Instead of the curriculum pseudo-labeling method, embodiments of the invention introduce the concept of percentile thresholds to unify fixed and variable score thresholds.

It is not straightforward to choose an optimal score threshold or interpret the meaning of a chosen one, because the confidence score distribution can be reshaped and shifted qualitatively by changing training components, such as the loss function or labeled data size. To improve the generality and interpretability of confidence-based selection, embodiments of the invention set positive and negative percentile thresholds $\kappa_{\pm}$, and pin down the corresponding score threshold $\tau_{\pm}$ such that $$Prob\left[p_c\left(\omega\left(x_U^{(i)}\right) \le \tau_{\pm}\right] = K \pm \text{ for } \left(x_U^{(i)}\right) \in D_U \tag{3}$$

For each class, if the negative sample ratio in labeled data is higher than the global $\kappa_+$, the local percentile threshold for that class is set to negative sample ratio. In short, embodiments of the invention use ground truth ratio in labeled data to avoid having an incorrectly high ratio of positive pseudo-labels.

Figures 2A, 2B, 2C:
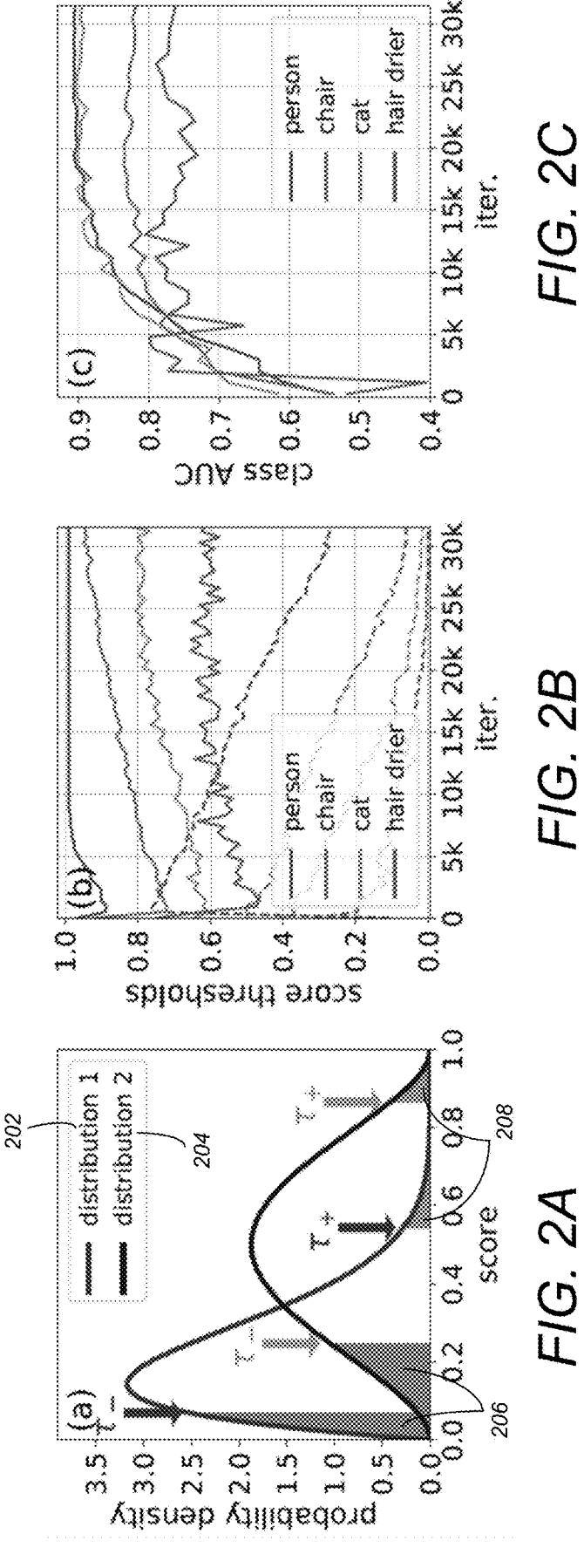
FIGS. 2A-2C illustrates percentile thresholds in accordance with one or more embodiments of the invention.

FIGS. 2A-2C illustrates percentile thresholds in accordance with one or more embodiments of the invention. FIG. 2A depicts two example distributions, which can be of the same class at different times, or of different classes. In other words, curves 202 and 204 are two different probability distributions of output scores, which can be different classes or the same class at different training stages. At the early stage of the training process, models tend to give conservative predictions, so the resulting score distributions are closer to curve 202 than curve 204. On the other hand, if the sample ratio of a class is high, its score distribution would shift right and become more similar to curve 204.

Both the $\tau_-$ arrows correspond to $\kappa_- = 0.1$ which means the area of each shadow 206 is 0.1; and the $\tau_+$ arrows correspond to $\kappa_+ = 0.98$ for both distributions. In other words, for a given negative percentile threshold $\kappa_- = 0.1$, the corresponding score threshold $\tau_-$ are determined so that the area of each shadow 206 under the distribution curve is 0.1, as the arrows indicated. Likewise, one can determine the positive score thresholds $\tau_+$ by calculating the shadow 208 under distribution curves which has an area of $1 - \kappa_+$.

Now the question becomes how to obtain the score distribution in order to connect percentile thresholds and score thresholds. As the sizes of unlabeled datasets are typically large in SSL scenarios, it is unnecessarily expensive to calculate the exact score distribution as that would require running model prediction on the whole unlabeled dataset at every training step. Instead, after dividing the [0,1] interval into K equal bins, for a given class c and training step t, the exponential moving average (EMA) histogram vector $P_{c(t)}=[P_{c(t)1}, \ldots, P_{c(t)K}]$ is used as a coarse-grain estimate of score distribution:

$$P_{c(t)} = \begin{cases} \left[\dfrac{1}{K}, \ldots, \dfrac{1}{K}\right], & \text{if } t = 0; \\ \lambda P_{c(t-1)} + (1-\lambda)\dfrac{1}{\mu B} \, hist\left(\{p_{c(t)}^{(i)}\}_{i=1}^{\mu B}\right), & \text{if } t > 0 \end{cases} \quad (4)$$

where hist denotes histogram function with K bins applied on each unlabeled mini-batch, and $\lambda \in [0,1]$ is a hyperparameter controlling momentum decay. When $\lambda=0$, $P_c$ is frozen so that score thresholds are fixed at $\tau_{\pm}=\kappa_{\pm}$; when $\lambda>0$, the score thresholds are varying automatically over different classes and iterations to make sure only a desired portion of pseudo-labels are selected. The estimate of score distribution does not require any extra inference.

The percentile threshold effectively down-samples for the majority of classes whose actual positive percentages are higher than $1-\kappa_{+}$. This feature helps to balance the class distributions in multi-label datasets.

For illustrative purposes, four classes in MS-COCO datasets are chosen as examples and sorted in descending order of their sample distribution ratio in labeled data as "person">"chair">"cat">"hair drier", e.g., half of the samples have class "person", yet class "hair drier" appears in less than 0.2% of the samples. FIG. 2B shows the trace of positive and negative score thresholds over 32K iterations. The score threshold curves are arranged in the order of class distribution ratio. After a quick warm up of the first 300 iterations, the positive score thresholds are increasing with some fluctuation, while the negative thresholds are decreasing as training progresses, leading to a gradually wider gap between $\kappa_{+}$ and $\kappa_{-}$ over time. To evaluate the learning status of each class, class ROC-AUC (ROC—Receiver Operating Characteristics; AUC—Area Under Curve) score is calculated on COCO val2014 dataset every 1K iterations. For highly imbalanced data, as the AUC score is not affected by different sampling rules, it is a better performance measure than accuracy or precision score. In other words, FIG. 2B shows the trace of score thresholds for four sample classes (person, chair, cat, and hair dryer) on MS-COCO with 10% labeled data and a 224 input size. The score thresholds correspond to percentile thresholds of $\kappa_{-}=0.1$ (dashed lines) and $\kappa_{+}=0.98$ (solid lines).

FIG. 2C shows the class ROC-AUC on the test set evaluated every 1K iterations. Interestingly, as FIG. 2C shows, the AUC scores of "person" and "cat" are fairly close to each other after 10K iterations, and higher than that of "chair", even when the positive score thresholds have different order. This suggests that the underlying class distribution has a strong effect on the score thresholds, and the number of high-confidence predictions itself is not a good indicator of learning status. A better indicator is described below.

Dynamic Unlabeled Loss Weights

Figures 3A, 3B, 3C:
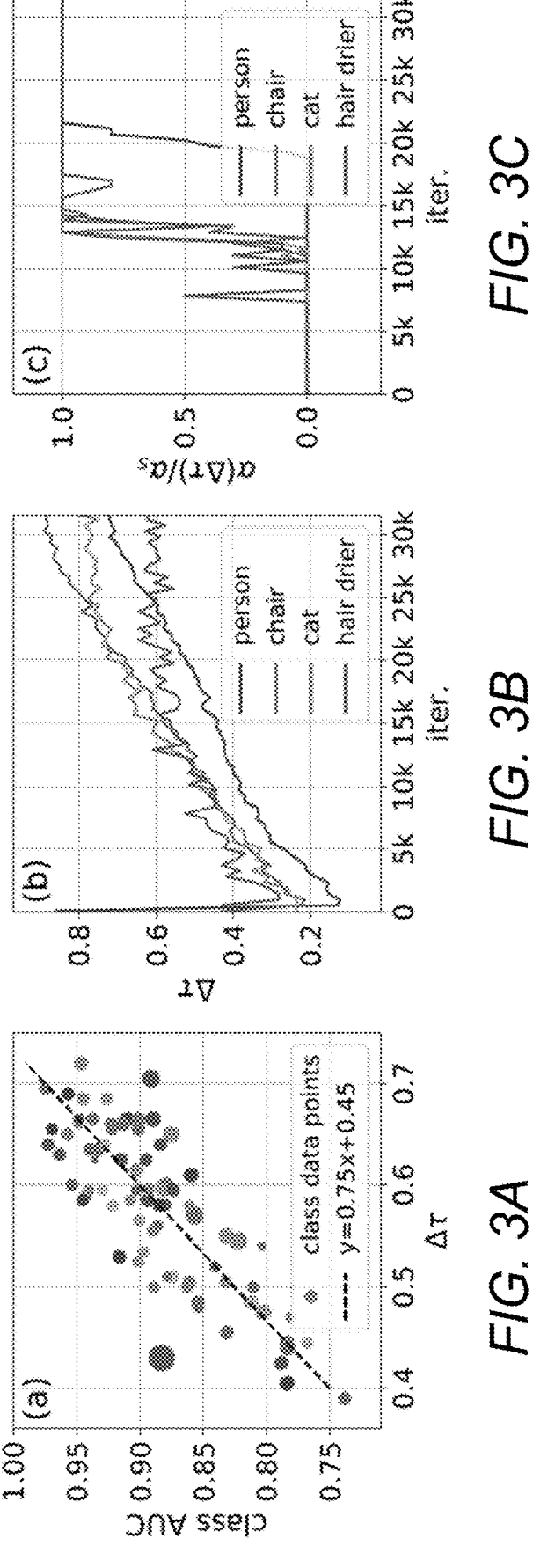
FIGS. 3A-3C illustrate dynamic unlabeled loss weights in accordance with one or more embodiments of the invention.

Prior SSL methods have introduced a time-dependent unlabeled loss weight $\alpha(t)$ to avoid poor local minima [13, 11]. The intuition of this special treatment for single-label dataset is that even when a score threshold is applied to select only high-score predictions, when a network is poorly calibrated at an early stage, it could give a lot of incorrect yet high confidence-score predictions and mislead the optimization process. This treatment becomes even more important for multi-label cases, because when class presence is independent, a model cannot correct the wrong impression of one class from knowledge of other classes. This raises the importance of the model learning status estimate, which can be used to control whether a pseudo-label should be involved in the training. As mentioned previously, the number of high score predictions is not necessarily related to learning status. On the other hand, from FIG. 2B, it may be noted that while the class ROC-AUC values increase over time, the gaps between positive and negative score thresholds $\Delta\tau=\tau_{+}\tau_{-}$ also increase. Enlightened by this, embodiments of the invention can verify that $\Delta\tau$ can be used as a good indicator of learning status by the linear relationship between $\Delta\tau$ and class ROC-AUC scores as shown in FIG. 3A. In this regard, FIGS. 3A-3C illustrate dynamic unlabeled loss weights. In particular, FIG. 3A shows the class AUC of all 80 classes as functions of corresponding $\Delta\tau=\tau_{+}-\tau_{-}$ values. The marker sizes are proportional to the fourth roots of class positive sample counts in the unlabeled dataset. The black dashed line is there for visual aid. FIG. 3B shows the trace of $\Delta\tau$ from the same experiment as FIGS. 2A-2C, and confirmed the trend of increasing threshold gap over time. FIG. 3C depicts the trace of corresponding unlabeled loss weights in units of $\alpha_s$ using Eq. (5), where $\gamma_0=0.5$ and $\gamma_s=0.55$.

Further, with $\Delta\tau$ of class c being indicators of class learning status, one can easily decide its unlabeled loss weight as:

$$\alpha(\Delta\tau) = \begin{cases} 0, & \text{if } \Delta\tau < Y_0 \text{ or } t < 300; \\ \alpha_s, & \text{if } \Delta\tau > Y_s; \\ \alpha_s \dfrac{\Delta\tau - Y_0}{Y_s - Y_0}, & \text{otherwise}; \end{cases} \quad (5)$$

where $\gamma_0$ and $\gamma_s$ are, correspondingly, the start and saturate values of threshold gap, and $\alpha_s$ is the saturate unlabeled loss weight. Some example traces of $\alpha(\Delta\tau)$ are shown in FIG. 3C, as each trace behaves similarly to time-controlled unlabeled loss weight, it gains extra flexibility allowing pseudo-labels of different learning difficulties to be involved at different time.

Table A illustrates an algorithm for performing the percentile-based dynamic thresholding for multi-label semi-supervised classification in accordance with one or more embodiments of the invention.

TABLE A

Require: a labeled dataset $D_L$, an unlabeled dataset $D_U$
Ensure: $0 \le \kappa_{-} < \kappa_{+} \le 1$
  For c = 1 to C do
    Initialize $P_c(0)$ using Eq. (4)
    Initialize $\kappa_{c,+}$ = max($\kappa_{+}$,ground truth negative ratio in $D_L$)
    Initialize $\kappa_{c,-}$ = min($\kappa_{-}$,ground truth negative ratio in $D_L$)
  End For
While not reach the maximum iteration do
  For c = 1 to C do     [Loop over each class]
    Convert percentile thresholds $\kappa_{c,\pm}$ to score thresholds $\tau_{c,\pm}$ using
      Eq. (3)
    Calculate class unlabeled loss weight $\alpha_c$ using Eq. (5)
    For i=1 to $\mu B$ do     [Loop over unlabeled mini-batch]

Obtain predictions $p_c^{(i)} = p_C(\omega(x_U^{(i)}))$ and $p_c(\Omega(x_U^{(i)}))$ Convert $p_c^{(i)}$ to pseudo-labels $\hat{p}_c^{(i)}$ by comparing with $\tau_{c,+}$ Calculate $g_c^{(i)}$ using Eq. (1)

TABLE A-continued

End For

Update $P_c$ with $\{p_c^{(i)}\}_{i=1}^{\mu B}$ using Eq. (4)

End For
Calculate loss using Eqs. (2), (6), and (7)
Update model parameters using Adam optimization
EndWhile
Return model parameters Finally, the total loss can be expressed as the weighted combination of supervised and unlabeled loss:

$$\mathcal{L} = \mathcal{L}_s + \alpha \mathcal{L}_u, \tag{6}$$

where $\alpha$ is the ratio of unlabeled loss to supervised loss, and $L_s$ is the supervised loss on labeled data $$\mathcal{L}_s = \frac{1}{B}\sum_{i=1}^{B}\mathcal{H}\big(y^{(i)},\, p(\omega\,(x^{(i)}))\big), \tag{7}$$

Figure 4:
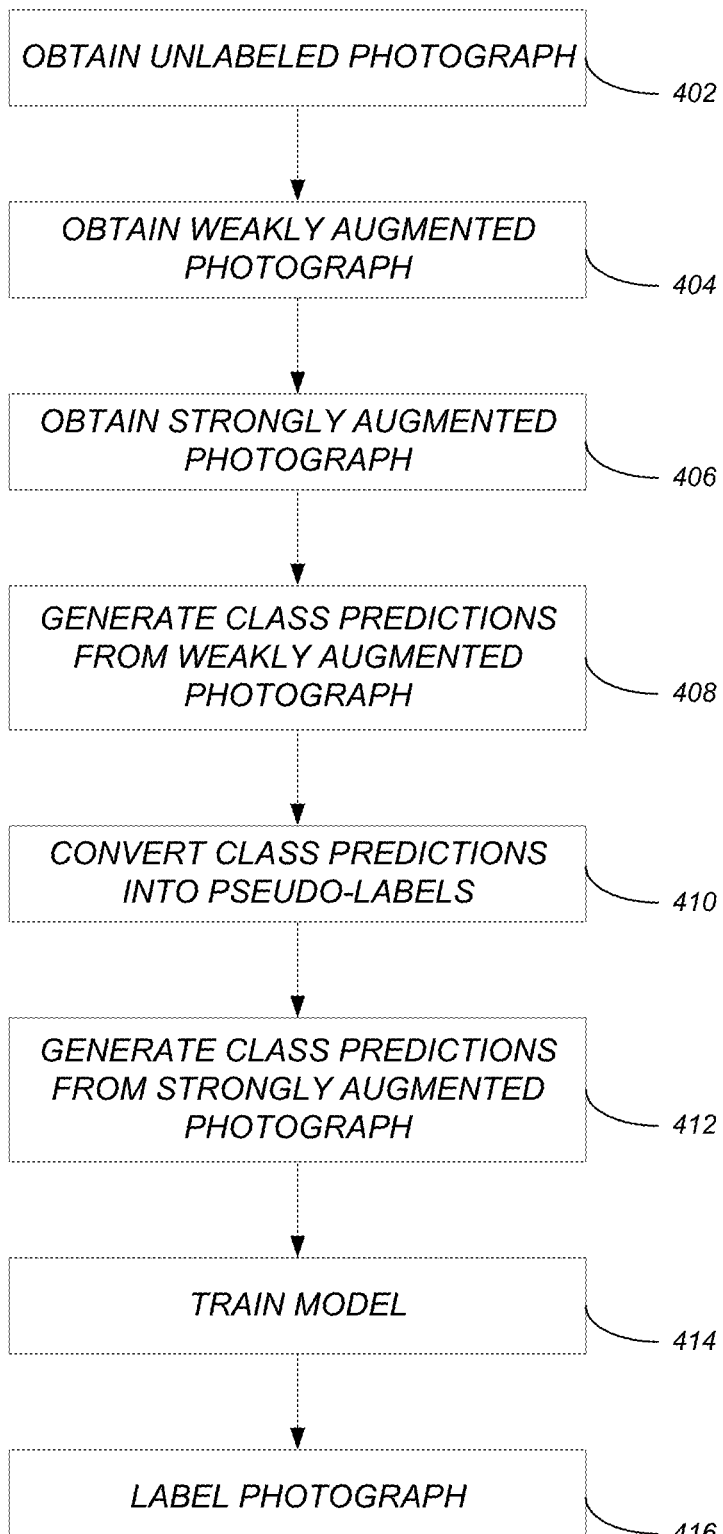
FIG. 4 illustrates the logical flow for augmenting (multi-label semi-supervised classification) a photograph using dynamic thresholding in accordance with one or more embodiments of the invention.

The pseudo-code of the algorithm is provided in Table A above. At each training step, the algorithm adds a negligibly small computational cost compared to FixMatch, mainly due to updating the score histogram vectors for unlabeled mini-batch and calculating dynamic unlabeled loss weights.
Logical Flow FIG. 4 illustrates the logical flow for augmenting (multi-label semi-supervised classification) a photograph using dynamic thresholding in accordance with one or more embodiments of the invention.

At step 402, an unlabeled photograph (e.g., of a construction project) is obtained.

At step 404, a weakly augmented photograph is obtained/generated based on the unlabeled photograph. The weakly augmented photograph is based on a first type of data augmentation.

At step 406, a strongly augmented photograph is obtained/generated based on the unlabeled photograph. The strongly augmented photograph is based on a second type of data augmentation. In addition, the strongly augmented photograph is more strongly augmented compared to that of the weakly augmented photograph.

At step 408, the weakly augmented photograph is processed through a model to generate multiple weakly augmented photograph class predictions. Each weakly augmented photograph class prediction is assigned a probability by the model. At step 410, the multiple weakly augmented photograph class predictions are converted into positive pseudo-labels or negative pseudo-labels. In this regard, a first class prediction, of the weakly augmented photograph class predictions, is converted to the positive pseudo-label when the probability for the first class prediction is above a positive score threshold. Such a positive score threshold is a fixed percentile threshold that unifies fixed and variable score thresholds. In addition. The positive pseudo-label indicates a presence of a class. A second class prediction, of the weakly augmented photograph class predictions, is converted to the negative pseudo-label when the probability for the second class prediction is below a negative score threshold. Such a negative score threshold is also a fixed percentile threshold that unifies fixed and variable score thresholds. In addition, the negative pseudo-label indicates an absence of a class. Lastly, a third class prediction, of the weakly augmented photograph label predictions, is disregarded when the probability for the third class prediction is in between the positive score threshold and the negative score threshold. In one or more embodiments, the fixed percentile thresholds are based on a ground truth ratio in labeled data that avoids having an incorrectly high ratio of the positive pseudo-labels.

At step 412, the strongly augmented photograph is processed through the model to generate a strongly augmented photograph class prediction.

At step 414, the model is trained to make the strongly augmented photograph label prediction match the positive pseudo-label via a cross-entropy loss. Such training is based on the positive pseudo-labels and the negative pseudo-labels.

In one or more embodiments, the training utilizes use an unlabeled loss weight. Specifically, a gap between the positive pseudo-label and the negative pseudo-label is determined. When the gap exceeds a threshold gap value, an unlabeled loss weight is determined for the gap. Such an unlabeled weight loss reflects a learning status for a class. Thereafter, the model is updated based on the unlabeled loss weight. The unlabeled weight loss indicates a performance level for converting to the positive pseudo-label. Further, the unlabeled weight loss enables positive pseudo-labels of different learning difficulties to be involved at different times.

In one or more additional embodiments, a total loss for converting to the positive pseudo-label may be determined as a weighted combination of supervised learning and the unlabeled loss weight. Such a total loss may then be used during the training. Further, the use of the unlabeled weight loss may improve performance due to an increasing gap between the positive score threshold (which increases) and the negative score threshold (which decreases) during/as the training progresses.

At step 416, the model is utilized to label the unlabeled photograph with multiple labels. Step 416 may also include the empirical validation of the augmenting using a public data set (e.g., PASCAL VOC2007 and/or MS-COCO). In addition, step 416 may include the use of the labeled photograph. For example, in one or more embodiments, the progress of a construction project may be tracked based on the labeled photograph. In further embodiments, real world construction may be modified based on the labeled photograph. In yet another example, collaboration amongst multiple stakeholders in a construction project may be enabled based on the labeled photograph.
Experiments
Implementation Details Embodiments of the invention were evaluated on Pascal VOC2007 and MS-COCO 2014 datasets with various labeled data ratio. ResNet50 was used as a model backbone and the same hyperparameters for all experiments were used across both datasets unless specifically indicated. All model weights were initialized randomly without pre-training for a fair comparison.

Pascal VOC2007 is a widely used multi-label classification dataset. It has 5,011 train-val images and 4,952 test images, each of which can contain 1 to 6 classes out of 20 classes. The imbalance ratio, which is the ratio of the sample size of the most majority class and that of the most minority class as a measure of class-imbalance extent. For example, the imbalance ratio of Pascal VOC2007 train-val set is 2008/96=20.9.

For the experiments, ResNet50 was used as the backbone with ML-decoder head [19], and the model was trained using an Adam optimizer [38] and one-cycle policy for 7K iterations, with a maximal learning rate of 3e-4. For regularization, the common ImageNet statistics normalization was applied to all input images, along with the data augmentation used in contrastive learning [4], which consists of center crop, random horizontal flip, and random cutout. In addition, three and eight random augmentation operations were added to the weak and strong augmentations for unlabeled data, correspondingly. The labeled batch size B was 36, and $\mu$ was set to 1. The saturate unlabeled loss weight was $\alpha_s=1$, and the start and saturate threshold gaps were $\gamma_0=0.5$ and $\gamma_s=0.55$. The percentile thresholds were $\kappa_-=0.1$, $\kappa_+=0.98$. The experiments show that the final performance is not very sensitive to these hyperparameters.

MS-COCO 2014 contains 82,783 training images and 40,504 validation images. There are 80 different labels which can appear at the same image, forming a multi-label classification problem. The training images can have 0 to 18 different classes. The most predominant class, person, appears in 45,174, and the most rare class, hair drier, only appears 128 times, resulting in an imbalance ratio of 353. All other hyperparameters were the same as experiments on Pascal VOC2007, except that 32K iterations were used for MS-COCO in order to accommodate the different dataset size.

Results

Tables B and C provide the mAP and AUC scores for different datasets in accordance with one or more embodiments of the invention and are described in further detail below.

For the Pascal VOC2007 dataset, two experiments were implemented with 10% (500 samples) and 20% (1000 samples) randomly selected from the train-val split (5011 samples) as the labeled set, correspondingly, and the rest as the unlabeled set. The result on Pascal VOC2007 reported in is the only benchmark on multi-label semi-supervised classification, and as such, the same model was used as the backbone and input size for fair comparison. The results are reported in Table B above. The method leads to a 2.04% mAP score improvement for Pascal VOC2007 20% labeled data, and a close score on 10% labeled data, compared with the previous SOTA results. It is worth mentioning that UPS is much slower than FixMatch and the present method, as it performs a big number of inference on each sample for uncertainty calculation and the training process need to be repeated for multiple generations of teacher-student cycles.

TABLE B

| Method | Backbone | Size | 10% labeled | | 20% labeled | |
| --- | --- | --- | --- | --- | --- | --- |
| | | | mAP | AUC | mAP | AUC |
| Supervised* | ResNet50 | 224 | 18.36 | — | 28.84 | — |
| PL*[13] | ResNet50 | 224 | 27.44 | — | 34.84 | — |
| MixMatch*[2] | ResNet50 | 224 | 29.57 | — | 37.02 | — |
| MT*[23] | ResNet50 | 224 | 32.55 | — | 39.62 | — |
| UPS*[20] | ResNet50 | 224 | 34.22 | — | 40.34 | — |
| PercentMatch | ResNet50 | 224 | 33.43 | 81.12 | 42.38 | 85.69 |
| PercentMatch | ResNet50 | 448 | 37.25 | 83.26 | 45.19 | 87.14 |

In view of the above, Table B provides mAP and AUC scores (in %) on the Pascal VOC2007 test set. Methods with * use scores reported in [20]. All models used start with randomly initialized weights and no pre-training. Bold font indicates the best mAP score of image size 224, and underline indicates the second best.

For MS-COCO dataset, three experiments were implemented with 2% (1640 samples), 5% (4100 samples) and 10% (8200 samples) randomly selected from the training images as the labeled set, correspondingly, and the rest as the unlabeled set. The model performance was tested on the whole validation set. It may be noted that any reported MS-COCO benchmark could not be found on multi-label semi-supervised classification, and as such, FixMatch was re-implemented using the same hyperparameters, except percentile thresholds $\kappa_\pm$ were replaced with fixed confidence thresholds $\tau_+=0.95$ and $\tau_-=0$ following the original paper. Embodiments of the invention can consistently outperform FixMatch on the mAP score, confirming that the dynamic thresholding is important to the overall performance. It may also be noted that embodiments of the invention gain bigger improvement when the labeled ratio is big compared to FixMatch, partially due to the fact that a higher labeled ratio leads to earlier involvement of unlabeled loss by exceeding the uniform $\gamma_0$ used for all experiments.

TABLE C

| Method | Backbone | Size | 2% labeled | | 5% labeled | | 10% labeled | |
| --- | --- | --- | --- | --- | --- | --- | --- | --- |
| | | | mAP | AUC | mAP | AUC | mAP | AUC |
| FixMatch | ResNet50 | 224 | 21.05 | 81.54 | 29.33 | 86.97 | 35.26 | 89.71 |
| PercentMatch | ResNet50 | 224 | 21.54 | 80.26 | 30.59 | 86.81 | 37.64 | 89.82 |
| PercentMatch | ResNet50 | 448 | 23.87 | 81.24 | 32.29 | 86.96 | 41.33 | 90.41 |

In view of the above, Table C provides mAP and AUC scores (in %) on the MS-COCO val2014 dataset. All models used were initialized randomly.

Hardware Embodiments

Figure 5:
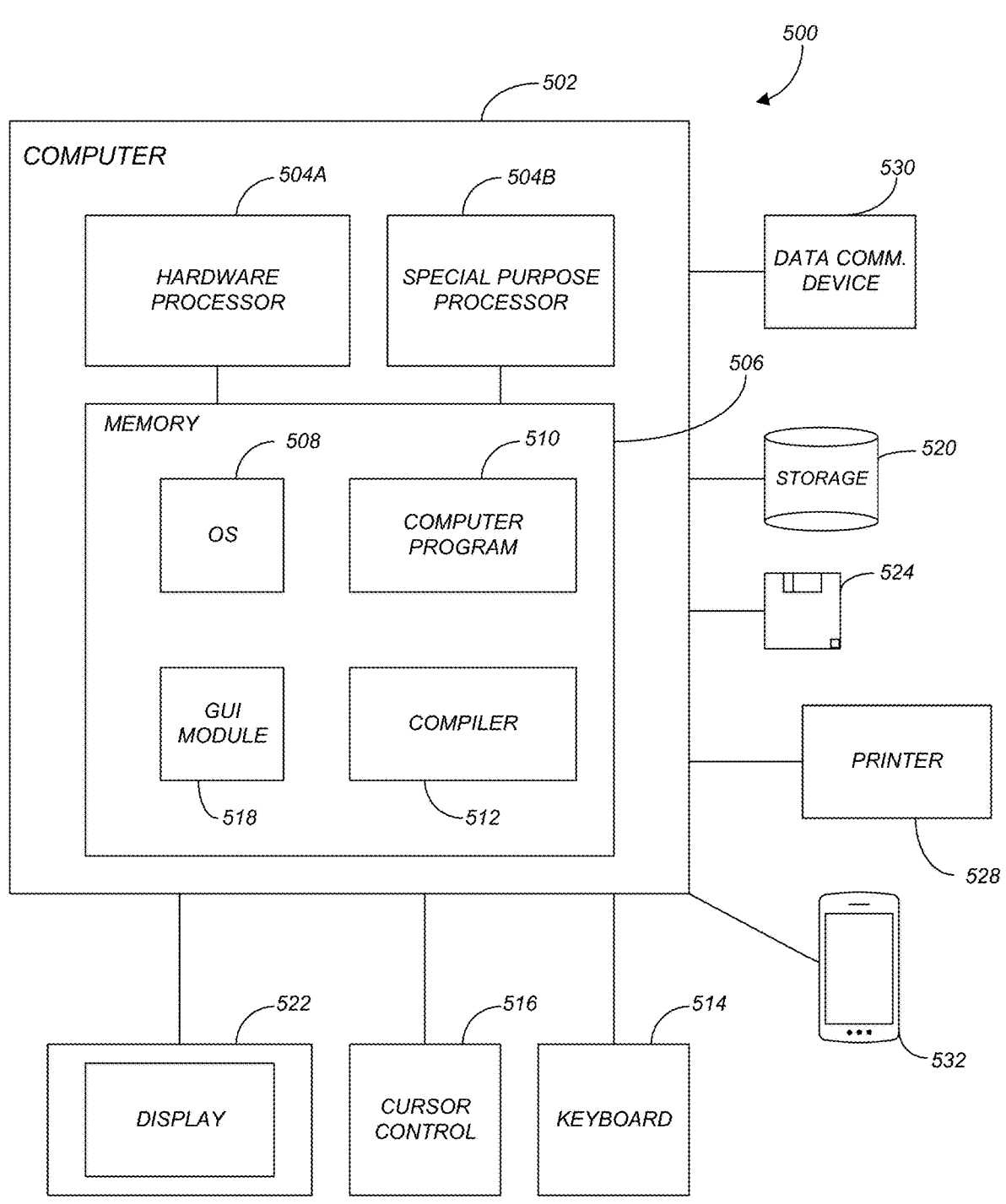
FIG. 5 is an exemplary hardware and software environment used to implement one or more embodiments of the invention.

FIG. 5 is an exemplary hardware and software environment 500 (referred to as a computer-implemented system and/or computer-implemented method) used to implement one or more embodiments of the invention. The hardware and software environment includes a computer 502 and may include peripherals. Computer 502 may be a user/client computer, server computer, or may be a database computer. The computer 502 comprises a hardware processor 504A and/or a special purpose hardware processor 504B (hereinafter alternatively collectively referred to as processor 504) and a memory 506, such as random access memory (RAM). The computer 502 may be coupled to, and/or integrated with, other devices, including input/output (I/O) devices such as a keyboard 514, a cursor control device 516 (e.g., a mouse, a pointing device, pen and tablet, touch screen, multi-touch device, etc.) and a printer 528. In one or more embodiments, computer 502 may be coupled to, or may comprise, a portable or media viewing/listening device 532 (e.g., an MP3 player, IPOD, NOOK, portable digital video player, cellular device, personal digital assistant, etc.). In yet another embodiment, the computer 502 may comprise a multi-touch device, mobile phone, gaming system, internet enabled television, television set top box, or other internet enabled device executing on various platforms and operating systems.

In one embodiment, the computer 502 operates by the hardware processor 504A performing instructions defined by the computer program 510 (e.g., a computer-aided design [CAD] application) under control of an operating system 508. The computer program 510 and/or the operating system 508 may be stored in the memory 506 and may interface with the user and/or other devices to accept input and commands and, based on such input and commands and the instructions defined by the computer program 510 and operating system 508, to provide output and results.

Output/results may be presented on the display 522 or provided to another device for presentation or further processing or action. In one embodiment, the display 522 comprises a liquid crystal display (LCD) having a plurality of separately addressable liquid crystals. Alternatively, the display 522 may comprise a light emitting diode (LED) display having clusters of red, green and blue diodes driven together to form full-color pixels. Each liquid crystal or pixel of the display 522 changes to an opaque or translucent state to form a part of the image on the display in response to the data or information generated by the processor 504 from the application of the instructions of the computer program 510 and/or operating system 508 to the input and commands. The image may be provided through a graphical user interface (GUI) module 518. Although the GUI module 518 is depicted as a separate module, the instructions performing the GUI functions can be resident or distributed in the operating system 508, the computer program 510, or implemented with special purpose memory and processors.

In one or more embodiments, the display 522 is integrated with/into the computer 502 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 502 according to the computer program 510 instructions may be implemented in a special purpose processor 504B. In this embodiment, some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program 510 instructions. In one embodiment, the special purpose processor 504B is an application specific integrated circuit (ASIC).

The computer 502 may also implement a compiler 512 that allows an application or computer program 510 written in a programming language such as C, C++, Assembly, SQL, PYTHON, PROLOG, MATLAB, RUBY, RAILS, HASKELL, or other language to be translated into processor 504 readable code. Alternatively, the compiler 512 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 510 accesses and manipulates data accepted from I/O devices and stored in the memory 506 of the computer 502 using the relationships and logic that were generated using the compiler 512.

The computer 502 also optionally comprises an external communication device such as a modem, satellite link, Ethernet card, or other device for accepting input from, and providing output to, other computers 502.

In one embodiment, instructions implementing the operating system 508, the computer program 510, and the compiler 512 are tangibly embodied in a non-transitory computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of computer program 510 instructions which, when accessed, read and executed by the computer 502, cause the computer 502 to perform the steps necessary to implement and/or use the present invention or to load the program of instructions into a memory 506, thus creating a special purpose data structure causing the computer 502 to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 502.

Figure 6:
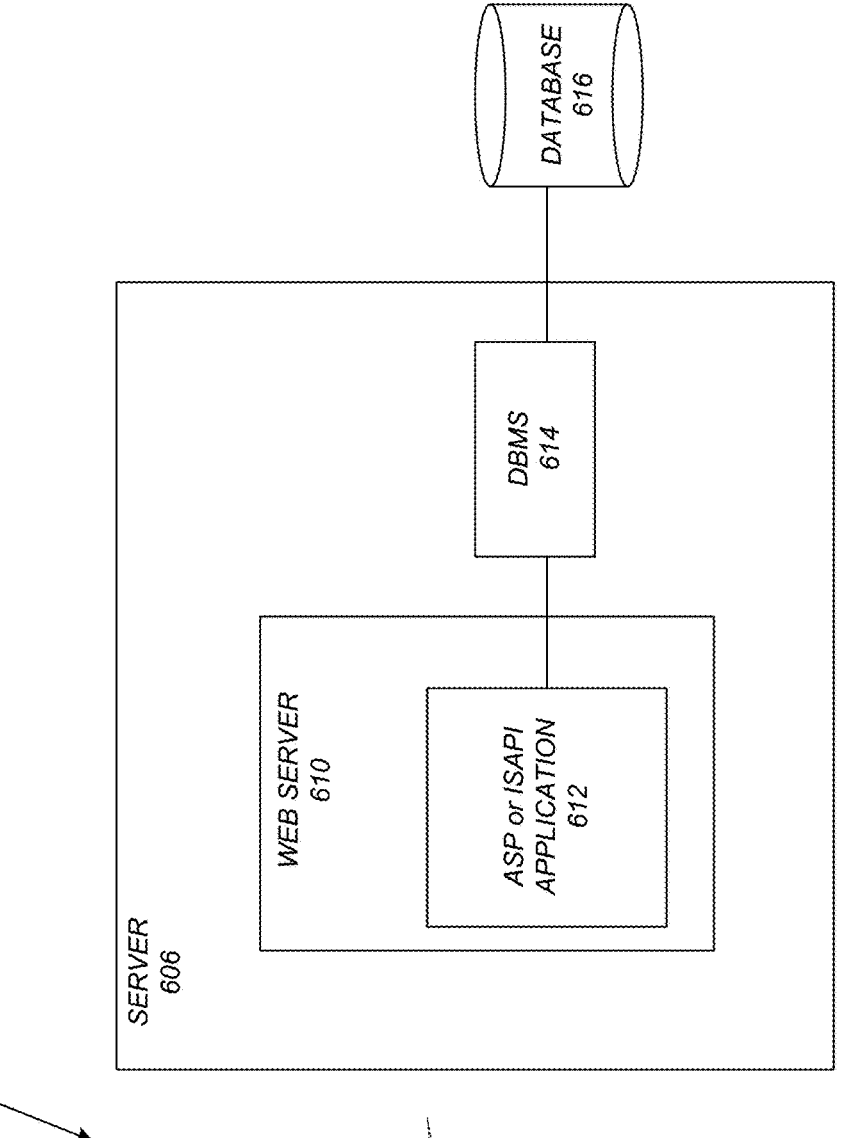
FIG. 6 schematically illustrates a typical distributed/cloud-based computer system in accordance with one or more embodiments of the invention.
Figure 6:
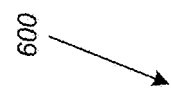
Figure 6:
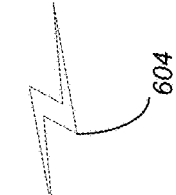
Figure 6:
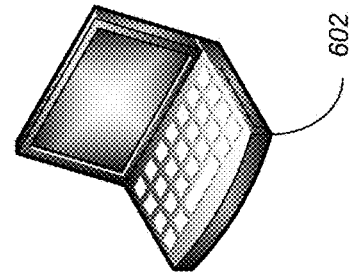

FIG. 6 schematically illustrates a typical distributed/cloud-based computer system 600 using a network 604 to connect client computers 602 to server computers 606. A typical combination of resources may include a network 604 comprising the Internet, LANs (local area networks), WANs (wide area networks), SNA (systems network architecture) networks, or the like, clients 602 that are personal computers or workstations (as set forth in FIG. 5), and servers 606 that are personal computers, workstations, minicomputers, or mainframes (as set forth in FIG. 5). However, it may be noted that different networks such as a cellular network (e.g., GSM [global system for mobile communications] or otherwise), a satellite based network, or any other type of network may be used to connect clients 602 and servers 606 in accordance with embodiments of the invention.

A network 604 such as the Internet connects clients 602 to server computers 606. Network 604 may utilize ethernet, coaxial cable, wireless communications, radio frequency (RF), etc. to connect and provide the communication between clients 602 and servers 606. Further, in a cloud-based computing system, resources (e.g., storage, processors, applications, memory, infrastructure, etc.) in clients 602 and server computers 606 may be shared by clients 602, server computers 606, and users across one or more networks. Resources may be shared by multiple users and can be dynamically reallocated per demand. In this regard, cloud computing may be referred to as a model for enabling access to a shared pool of configurable computing resources.

Clients 602 may execute a client application or web browser and communicate with server computers 606 executing web servers 610. Such a web browser is typically a program such as MICROSOFT INTERNET EXPLORER/

EDGE, MOZILLA FIREFOX, OPERA, APPLE SAFARI, GOOGLE CHROME, etc. Further, the software executing on clients 602 may be downloaded from server computer 606 to client computers 602 and installed as a plug-in or ACTIVEX control of a web browser. Accordingly, clients 602 may utilize ACTIVEX components/component object model (COM) or distributed COM (DCOM) components to provide a user interface on a display of client 602. The web server 610 is typically a program such as MICROSOFT'S INTERNET INFORMATION SERVER.

Web server 610 may host an Active Server Page (ASP) or Internet Server Application Programming Interface (ISAPI) application 612, which may be executing scripts. The scripts invoke objects that execute business logic (referred to as business objects). The business objects then manipulate data in database 616 through a database management system (DBMS) 614. Alternatively, database 616 may be part of, or connected directly to, client 602 instead of communicating/obtaining the information from database 616 across network 604. When a developer encapsulates the business functionality into objects, the system may be referred to as a component object model (COM) system. Accordingly, the scripts executing on web server 610 (and/or application 612) invoke COM objects that implement the business logic. Further, server 606 may utilize MICROSOFT'S TRANSACTION SERVER (MTS) to access required data stored in database 616 via an interface such as ADO (Active Data Objects), OLE DB (Object Linking and Embedding DataBase), or ODBC (Open DataBase Connectivity).

Generally, these components 600-616 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 602 and 606 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 602 and 606. Embodiments of the invention are implemented as a software/CAD application on a client 602 or server computer 606. Further, as described above, the client 602 or server computer 606 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

Further, contributions of embodiments of the invention include: (1) a simple dynamic threshold framework to reduce the noise induced by incorrect pseudo-labels; (2) a natural methodology that can generalize prior SSL methods from single-label classification to multi-label classification, (3) empirical experiments showing that our method has outperformed the previous results on the Pascal VOC2007 [6], and new benchmark results on an MS-COCO [14] dataset.

While previous studies have developed different SSL methodologies to leverage unlabeled data, most of them focus on single-label classification. Embodiments of the invention analyze some special challenges in multi-label semi-supervised classification with illustrative examples. To address these challenges, embodiments of the invention (also referred to as PercentMatch) provide a percentile-based dynamic thresholding framework that maintains the simplicity of FixMatch and naturally introduces dynamical score thresholds for positive and negative pseudo-labels. In addition, the adaptive unlabeled loss weights decided by the difference of two score thresholds helps to reduce noise introduced by incorrect pseudo-labels at early training stage. Embodiments of the invention lead to strong performance and fast convergence on standard multi-label datasets. Further, percentile-based thresholding has more potential usages in SSL, for example by gradually lowering the positive percentile threshold, one can introduce curriculum learning to the framework.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Eric Arazo, Diego Ortego, Paul Albert, Noel E O'Connor, and Kevin McGuinness. Pseudo-labeling and confirmation bias in deep semi-supervised learning. In 2020 International Joint Conference on Neural Networks (IJCNN), pages 1-8. IEEE, 2020.

[2] David Berthelot, Nicholas Carlini, Ian Goodfellow, Nicolas Papernot, Avital Oliver, and Colin A Raffel. Mixmatch: A holistic approach to semi-supervised learning. Advances in neural information processing systems, 32, 2019.

[3] Paola Cascante-Bonilla, Fuwen Tan, Yanjun Qi, and Vicente Ordonez. Curriculum labeling: Revisiting pseudo-labeling for semi-supervised learning. In Thirty-Fifth AAAI Conference on Artificial Intelligence, AAAI 2021, Thirty-Third Conference on Innovative Applications of Artificial Intelligence, IAAI 2021, The Eleventh Symposium on Educational Advances in Artificial Intelligence, EAAI 2021, Virtual Event, Feb. 2-9, 2021, pages 6912-6920. AAAI Press, 2021.

[4] Ting Chen, Simon Kornblith, Mohammad Norouzi, and Geoffrey Hinton. A simple frame-work for contrastive learning of visual representations. In International conference on machine learning, pages 1597-1607. PMLR, 2020.

[5] Ismail Elezi, Zhiding Yu, Anima Anandkumar, Laura Leal-Taixe, and Jose M Alvarez. Not all labels are equal: Rationalizing the labeling costs for training object detection. In Proceedings of the IEEE/CVF Conference on Computer Vision and Pattern Recognition, pages 14492-14501,2022.

[6] M. Everingham, L. Van Gool, C. K. I. Williams, J. Winn, and A. Zisserman. The pascal visual object classes (voc) challenge. International Journal of Computer Vision, 88(2):303-338, June 2010.

[7] Daeyoung Gil, Ghang Lee, and Kahyun Jeon. Classification of images from construction sites using a deep-learning algorithm. In ISARC. Proceedings of the International Symposium on Automation and Robotics in Construction, volume 35, pages 1-6. IAARC Publications, 2018.

[8] Chen Gong, Dacheng Tao, Stephen J Maybank, Wei Liu, Guoliang Kang, and Jie Yang. Multi-modal curriculum learning for semi-supervised image classification. IEEE Transactions on Image Processing, 25(7):3249-3260, 2016.

[9] Guy Hacohen and Daphna Weinshall. On the power of curriculum learning in training deep networks. In International Conference on Machine Learning, pages 2535-2544. PMLR, 2019.

[10] Joel Hestness, Sharan Narang, Newsha Ardalani, Gregory F. Diamos, Heewoo Jun, Hassan Kianinejad, Md. Mostofa Ali Patwary, Yang Yang, and Yanqi Zhou. Deep learning scaling is predictable, empirically. CoRR, abs/1712.00409, 2017.

[11] Samuli Laine and Timo Aila. Temporal ensembling for semi-supervised learning. ArXiv, abs/1610.02242, 2017.

[12] Yann LeCun, Leon Bottou, Yoshua Bengio, and Patrick Haffner. Gradient-based learning applied to document recognition. Proceedings of the IEEE, 86(11):2278-2324, 1998.

[13] Dong-Hyun Lee et al. Pseudo-label: The simple and efficient semi-supervised learning method for deep neural networks. In Workshop on challenges in representation learning, ICML, volume 3, page 896, 2013.

[14] Tsung-Yi Lin, Michael Maire, Serge Belongie, James Hays, Pietro Perona, Deva Ramanan, Piotr Dollár, and C Lawrence Zitnick. Microsoft coco: Common objects in context. In European conference on computer vision, pages 740-755. Springer, 2014.

[15] Fengbei Liu, Yu Tian, Filipe R. Cordeiro, Vasileios Belagiannis, Ian D. Reid, and Gustavo Carneiro. Self-supervised mean teacher for semi-supervised chest x-ray classification. In Chunfeng Lian, Xiaohuan Cao, Islem Rekik, Xuanang Xu, and Pingkun Yan, editors, Machine Learning in Medical Imaging—12th International Workshop, MLMI 2021, Held in Conjunction with MICCAI 2021, Strasbourg, France, Sep. 27, 2021, Proceedings, volume 12966 of Lecture Notes in Computer Science, pages 426-436. Springer, 2021.

[16] Dhruv Mahajan, Ross Girshick, Vignesh Ramanathan, Kaiming He, Manohar Paluri, Yix-uan Li, Ashwin Bharambe, and Laurens Van Der Maaten. Exploring the limits of weakly supervised pretraining. In Proceedings of the European conference on computer vision (ECCV), pages 181-196, 2018.

[17] Colin Raffel, Noam Shazeer, Adam Roberts, Katherine Lee, Sharan Narang, Michael Matena, Yanqi Zhou, Wei Li, Peter J Liu, et al. Exploring the limits of transfer learning with a unified text-to-text transformer. J. Mach. Learn. Res., 21(140):1-67, 2020.

[18] Tal Ridnik, Emanuel Ben-Baruch, Nadav Zamir, Asaf Noy, Itamar Friedman, Matan Protter, and Lihi Zelnik-Manor. Asymmetric loss for multi-label classification. In Proceedings of the IEEE/CVF International Conference on Computer Vision, pages 82-91, 2021.

[19] Tal Ridnik, Gilad Sharir, Avi Ben-Cohen, Emanuel Ben-Baruch, and Asaf Noy. Ml-decoder: Scalable and versatile classification head. In Proceedings of the IEEE/CVF Winter Conference Applications of Computer Vision (pp. 3241).

[20] Mamshad Nayeem Rizve, Kevin Duarte, Yogesh S Rawat, and Mubarak Shah. In defense of pseudo-labeling: An uncertainty-aware pseudo-label selection framework for semi-supervised learning. In International Conference on Learning Representations, 2021. arXiv preprint arXiv:2101.06329 (2021).

[21] Mehdi S. M. Sajjadi, Mehran Javanmardi, and Tolga Tasdizen. Regularization with stochastic transformations and perturbations for deep semi-supervised learning. In NIPS, 2016. Advances in neural information processing systems, 29.

[22] Kihyuk Sohn, David Berthelot, Nicholas Carlini, Zizhao Zhang, Han Zhang, Colin A Raffel, Ekin Dogus Cubuk, Alexey Kurakin, and Chun-Liang Li. Fixmatch: Simplifying semi-supervised learning with consistency and confidence. Advances in neural information processing systems, 33:596-608, 2020.

[23] Antti Tarvainen and Harri Valpola. Mean teachers are better role models: Weight-averaged consistency targets improve semi-supervised deep learning results. Advances in neural information processing systems, 30, 2017.

[24] Hiroki Tokunaga, Brian Kenji Iwana, Yuki Teramoto, Akihiko Yoshizawa, and Ryoma Bise. Negative pseudo labeling using class proportion for semantic segmentation in pathology. Computer Vision—ECCV 2020, page 430-446, 2020.

[25] Laurens Van der Maaten and Geoffrey Hinton. Visualizing data using t-sne. Journal of machine learning research, 9(11), 2008.

[26] Xiaosong Wang, Yifan Peng, Le Lu, Zhiyong Lu, Mohammadhadi Bagheri, and Ronald M. Summers. Chestx-ray8: Hospital-scale chest x-ray database and benchmarks on weakly-supervised classification and localization of common thorax diseases. In 2017 IEEE Conference on Computer Vision and Pattern Recognition, CVPR 2017, Honolulu, HI, USA, Jul. 21-26, 2017, pages 3462-3471. IEEE Computer Society, 2017.

[27] Yidong Wang, Hao Chen, Qiang Heng, Wenxin Hou, Yue Fan, Zhen Wu, Marios Savvides, Takahiro Shinozaki, Bhiksha Raj, and Bernt Schiele. Freematch: Self-adaptive thresholding for semi-supervised learning. CoRR, abs/arXiv preprint arXiv:2205.07246, 2022.

[28] Yuchao Wang, Haochen Wang, Yujun Shen, Jingjing Fei, Wei Li, Guoqiang Jin, Liwei Wu, Rui Zhao, and Xinyi Le. Semi-supervised semantic segmentation using unreliable pseudo-labels. ArXiv, abs/2203.03884, 2022. In Proceedings of the IEEE/CVF Conference on Computer Vision and Pattern Recognition (pp. 4248-4257),

[29] Xiaoxia Wu, Ethan Dyer, and Behnam Neyshabur. When do curricula work? In 9th International Conference on Learning Representations, ICLR 2021, Virtual Event, Austria, May 3-7, 2021. OpenReview.net, 2021.

[30] Qizhe Xie, Zihang Dai, Eduard H. Hovy, Thang Luong, and Quoc Le. Unsupervised data augmentation for consistency training. In Hugo Larochelle, Marc'Aurelio Ranzato, Raia Hadsell, Maria-Florina Balcan, and Hsuan-Tien Lin, editors, Advances in Neural Information Processing Systems 33: Annual Conference on Neural Information Processing Systems 2020, NeurIPS 2020, Dec. 6-12, 2020, virtual, 2020.

[31] Chen Xing, Sercan Ömer Arik, Zizhao Zhang, and Tomas Pfister. Distance-based learning from errors for confidence calibration. In 8th International Conference on Learning Representations, ICLR 2020, Addis Ababa, Ethiopia, Apr. 26-30, 2020. OpenReview.net, 2020.

[32] Yi Xu, Lei Shang, Jinxing Ye, Qi Qian, Yu-Feng Li, Baigui Sun, Hao Li, and Rong Jin. Dash: Semi-supervised learning with dynamic thresholding. In Marina Meila and Tong Zhang, editors, Proceedings of the 38th International Conference on Machine Learning, ICML 2021, 18-24 Jul. 2021, Virtual Event, volume 139 of Proceedings of Machine Learning Research, pages 11525-11536. PMLR, 2021.

[33] Ismet Zeki Yalniz, Herve'Je'gou, Kan Chen, Manohar Paluri, and Dhruv Kumar Mahajan. Billion-scale semi-supervised learning for image classification. ArXiv, abs/1905.00546, 2019.

[34] Xiangli Yang, Zixing Song, Irwin King, and Zenglin Xu. A survey on deep semi-supervised learning. *IEEE Transactions an Knowledge and Data Engineering* (2022).

[35] Bowen Zhang, Yidong Wang, Wenxin Hou, Hao Wu, Jindong Wang, Manabu Okumura, and Takahiro Shinozaki. Flexmatch: Boosting semi-supervised learning with curriculum pseudo labeling. Advances in Neural Information Processing Systems, 34:18408-18419, 2021.

[36] Zhedong Zheng and Yi Yang. Rectifying pseudo label learning via uncertainty estimation for domain adaptive semantic segmentation. International Journal of Computer Vision, 129(4):1106-1120, 2021.

[37] Xiaojin Jerry Zhu. Semi-supervised learning literature survey. Technical report, 2005.

[38] Kingma, D. P. and Ba, J., 2014. Adam: A method for stochastic optimization. arXiv preprint arXiv: 1412.6980.

What is claimed is:

1. A computer-implemented method for augmenting a photograph, comprising:
(a) obtaining an unlabeled photograph;
(b) obtaining a weakly augmented photograph based on the unlabeled photograph, wherein the weakly augmented photograph is based on a first type of data augmentation;
(c) obtaining a strongly augmented photograph based on the unlabeled photograph, wherein:
(i) the strongly augmented photograph is based on a second type of data augmentation; and
(ii) the strongly augmented photograph is more strongly augmented compared to that of the weakly augmented photograph;
(d) processing the weakly augmented photograph through a model to generate multiple weakly augmented photograph class predictions, wherein each weakly augmented photograph class prediction is assigned a probability by the model;
(e) converting the multiple weakly augmented photograph class predictions into positive pseudo-labels or negative pseudo-labels, wherein:
(i) a first class prediction, of the weakly augmented photograph class predictions, is converted to the positive pseudo-label when the probability for the first class prediction is above a positive score threshold, wherein the positive score threshold comprises a fixed percentile threshold that unifies fixed and variable score thresholds, and wherein the positive pseudo-label indicates a presence of a class;
(ii) a second class prediction, of the weakly augmented photograph class predictions, is converted to the negative pseudo-label when the probability for the second class prediction is below a negative score threshold, wherein the negative score threshold comprises a fixed percentile threshold that unifies fixed and variable score thresholds, and wherein the negative pseudo-label indicates an absence of a class; and
(iii) a third class prediction, of the weakly augmented photograph label predictions, is disregarded when the probability for the third class prediction is in between the positive score threshold and the negative score threshold;
(f) processing the strongly augmented photograph through the model to generate a strongly augmented photograph class prediction;
(g) training the model to make the strongly augmented photograph label prediction match the positive pseudo-label via a cross-entropy loss, wherein the training is based on the positive pseudo-labels and the negative pseudo-labels; and
(h) utilizing the model to label the unlabeled photograph with multiple labels.

2. The computer-implemented method of claim 1, wherein the photograph is of a construction project.

3. The computer-implemented method of claim 1, wherein the fixed percentile threshold is based on a ground truth ratio in labeled data that avoids having an incorrectly high ratio of the positive pseudo-labels.

4. The computer-implemented method of claim 1, wherein the training the model comprises:
determining a gap between the positive pseudo-label and the negative pseudo-label;
when the gap exceeds a threshold gap value, determining an unlabeled loss weight for the gap, wherein the unlabeled weight loss reflects a learning status for a class; and
updating the model based on the unlabeled loss weight, wherein the unlabeled weight loss indicates a performance level for converting to the positive pseudo-label, and wherein the unlabeled weight loss enables positive pseudo-labels of different learning difficulties to be involved at different times.

5. The computer-implemented method of claim 4, further comprising:
determining a total loss for converting to the positive pseudo-label as a weighted combination of supervised learning and the unlabeled loss weight, wherein the total loss is used during the training.

6. The computer-implemented method of claim 4, wherein:
as the training progresses, the positive score threshold increases and the negative score threshold decreases thereby increasing the gap.

7. The computer-implemented method of claim 1, further comprising:
empirically validating the augmenting using a public data set.

8. The computer-implemented method of claim 1, further comprising:
tracking progress of a construction project based on the labeled photograph.

9. The computer-implemented method of claim 1, further comprising:
modifying real world construction based on the labeled photograph.

10. The computer-implemented method of claim 1, further comprising:
enabling collaboration amongst multiple stakeholders in a construction project based on the labeled photograph.

11. A computer-implemented system for augmenting a photograph, comprising:

(a) a computer having a memory;

(b) a processor executing on the computer;

(c) the memory storing a set of instructions, wherein the set of instructions, when executed by the processor cause the processor to perform operations comprising:

(i) obtaining an unlabeled photograph;

(ii) obtaining a weakly augmented photograph based on the unlabeled photograph, wherein the weakly augmented photograph is based on a first type of data augmentation;

(iii) obtaining a strongly augmented photograph based on the unlabeled photograph, wherein:

(1) the strongly augmented photograph is based on a second type of data augmentation; and (2) the strongly augmented photograph is more strongly augmented compared to that of the weakly augmented photograph;

(iv) processing the weakly augmented photograph through a model to generate multiple weakly augmented photograph class predictions, wherein each weakly augmented photograph class prediction is assigned a probability by the model;

(v) converting the multiple weakly augmented photograph class predictions into positive pseudo-labels or negative pseudo-labels, wherein:

(1) a first class prediction, of the weakly augmented photograph class predictions, is converted to the positive pseudo-label when the probability for the first class prediction is above a positive score threshold, wherein the positive score threshold comprises a fixed percentile threshold that unifies fixed and variable score thresholds, and wherein the positive pseudo-label indicates a presence of a class;

(2) a second class prediction, of the weakly augmented photograph class predictions, is converted to the negative pseudo-label when the probability for the second class prediction is below a negative score threshold, wherein the negative score threshold comprises a fixed percentile threshold that unifies fixed and variable score thresholds, and wherein the negative pseudo-label indicates an absence of a class; and (3) a third class prediction, of the weakly augmented photograph label predictions, is disregarded when the probability for the third class prediction is in between the positive score threshold and the negative score threshold;

(vi) processing the strongly augmented photograph through the model to generate a strongly augmented photograph class prediction;

(vii) training the model to make the strongly augmented photograph label prediction match the positive pseudo-label via a cross-entropy loss, wherein the training is based on the positive pseudo-labels and the negative pseudo-labels; and (viii) utilizing the model to label the unlabeled photograph with multiple labels.

12. The computer-implemented system of claim 11, wherein the photograph is of a construction project.

13. The computer-implemented system of claim 11, wherein the fixed percentile threshold is based on a ground truth ratio in labeled data that avoids having an incorrectly high ratio of the positive pseudo-labels.

14. The computer-implemented system of claim 11, wherein the operation training the model comprises:

determining a gap between the positive pseudo-label and the negative pseudo-label;

when the gap exceeds a threshold gap value, determining an unlabeled loss weight for the gap, wherein the unlabeled weight loss reflects a learning status for a class; and updating the model based on the unlabeled loss weight, wherein the unlabeled weight loss indicates a performance level for converting to the positive pseudo-label, and wherein the unlabeled weight loss enables positive pseudo-labels of different learning difficulties to be involved at different times.

15. The computer-implemented system of claim 14, wherein the operations further comprise:

determining a total loss for converting to the positive pseudo-label as a weighted combination of supervised learning and the unlabeled loss weight, wherein the total loss is used during the training.

16. The computer-implemented system of claim 14, wherein:

as the training progresses, the positive score threshold increases and the negative score threshold decreases thereby increasing the gap.

17. The computer-implemented system of claim 11, wherein the operations further comprise:

empirically validating the augmenting using a public data set.

18. The computer-implemented system of claim 11, wherein the operations further comprise:

tracking progress of a construction project based on the labeled photograph.

19. The computer-implemented system of claim 11, wherein the operations further comprise:

modifying real world construction based on the labeled photograph.

20. The computer-implemented system of claim 11, wherein the operations further comprise:

enabling collaboration amongst multiple stakeholders in a construction project based on the labeled photograph.

* * * * *